INVENTOR
GIUSEPPE ALFIERI

INVENTOR
GIUSEPPE ALFIERI

INVENTOR
GIUSEPPE ALFIERI

United States Patent Office 3,048,451
Patented Aug. 7, 1962

3,048,451
AUTOMATIC BRAKE SYSTEM INCLUDING SAFETY CUT-OFF VALVES FOR EACH BRAKE SECTION
Giuseppe Alfieri, Milan, Italy, assignor to Fabbrica Italiana Magneti Marelli S.p.A., Milan, Italy, an Italian company
Filed Mar. 5, 1959, Ser. No. 797,400
Claims priority, application Italy Mar. 18, 1958
8 Claims. (Cl. 303—29)

The present invention relates to improvements in pneumatic braking equipment, and more particularly to apparatus for the distribution of fluid in vehicles with two or more braking sections and of the type employing a pneumatic or mechanical device for actuating rockers to control cut-off valves and distributing valves and provided with a tank for each braking section, the tanks being controlled by said valves.

It is an object of the present invention to provide improved distribution control apparatus for the above-indicated type of equipment.

A device provided in accordance with one embodiment of the invention is, by way of example, characterized in that cut-off valves are controlled by means of a rocker attached to a rod rigidly connected to an actuating member or piston, while associated distributing valves are controlled by a second rocker associated elastically with the motion of said actuating member and guided by the rod, around which it can pivot. The displacement of the piston can be opposed by an adjustable elastic assembly and the force transmitted thereby in the final braking stage is adjustable.

The invention is illustrated merely by way of example with reference to the accompanying drawings wherein:

FIG. 1 diagrammatically illustrates braking equipment with two sections as applied to the trailer of a composite tractor-trailer vehicle;

Figure 1:
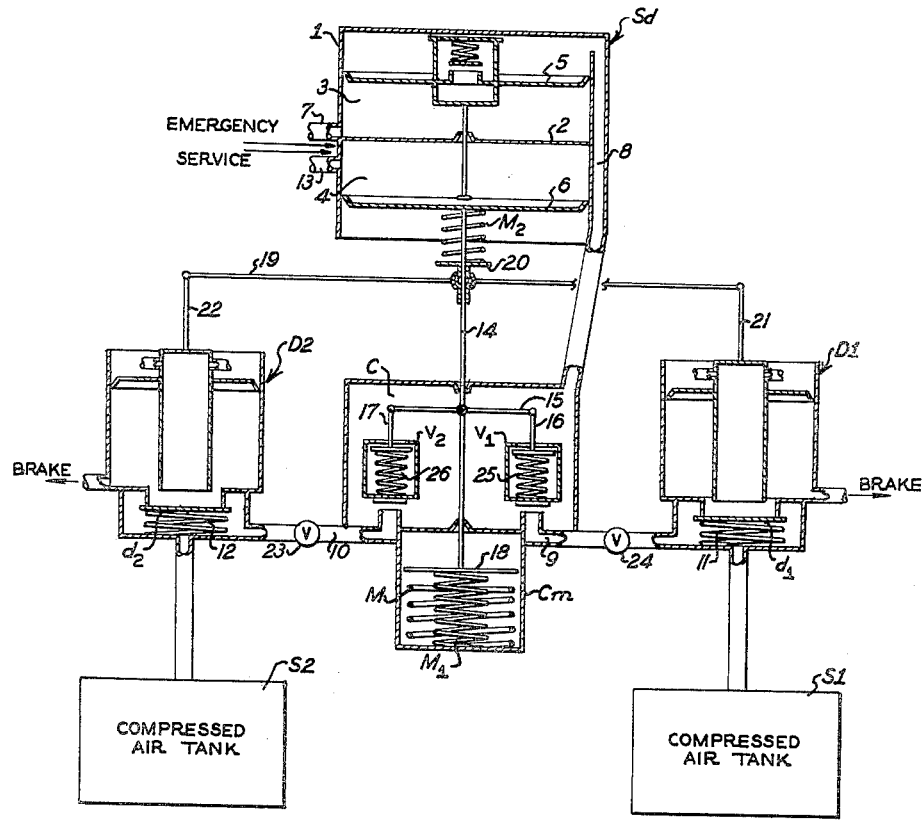

The equipment of FIG. 1 comprises essentially an emergency relay valve Sd of conventional kind, two distributors D1 and D2, two groups of cut-off valves V1 and V2 and two compressed air tanks S1 and S2. The emergency relay valve is constituted by the cylinder 1 subdivided by the partition 2 into two chambers 3 and 4, in which slide pistons 5 and 6 respectively.

The chamber 3, fed by emergency conduit 7 from the tank of the tractor, is always under pressure (operating pressure) and supplies in turn, through the conduit 8, the chamber C, connected through the cut-off valves V1 and V2 and the conduits 9 and 10 respectively to the prechambers 11 and 12 and to the tanks S1 and S2 of the distributors D1 and D2. During the braking stage, the medium under pressure flows from tanks S1 and S2 through the distributors D1 and D2 to the corresponding braking elements of the trailer.

In conduits 9 and 10 are positioned manual shut off valves 24 and 23 respectively. These shut off valves permit the closing of the conduits to allow a faulty section to be repaired.

The chamber 4 is fed by the service conduit 13 coming from the tank of the tractor through a distributor which is placed on the tractor and is actuated as known per se by the brake pedal.

In chamber 4, the compressed air arrives only during the braking stage and flows out as soon as the braking action ceases. Thus, during the braking of the tractor, the pressure medium in the tractor tank is supplied through the tractor valve to the braking equipment of the tractor and to the chamber 4 of the emergency relay valve of the trailer.

The value of pressure present depends on the position of the brake pedal during the braking stage. The maximum value attainable is that of the operating pressure of chamber 3.

Rigidly connected with the piston 6 is the actuating stem or rod 14 to which the rocker 15 is centrally pivoted, the rocker being pivoted at its ends to the push-rods 16 and 17. Each of the push-rods is provided with an elastic element 25 or 26 to resist movement of the push-rod. The push-rods control the cut-off valves V1 and V2.

The displacement of the piston 6 is opposed not only by various resistances and by the normal return springs of the system with which it is associated, but also by an optional reaction spring M. Spring M constitutes together with the opposed spring $M_1$ of the piston an elastic assembly housed in the special cylinder Cm within which the disc 18 can move, this disc being mounted on the lower extremity of the rod 14. It is clear that by varying the rigidity of the above assembly and particularly of the spring M, the force opposing the displacement of the piston 6 can be varied.

The actuation of the distributor sections D1 and D2 is obtained through a second rocker centrally hinged to the slide bearing 20 which is slidable on the rod 14 and in turn connected with the piston 6 through the spring $M_2$.

Rocker 19 controls the opening of the distribution valves $d_1$ and $d_2$.

Operation of the above distributing equipment is as follows:

If the driver of the composite tractor-trailer vehicle depresses the brake pedal of the tractor, pressure medium is supplied to the chamber 4 of the trailer, and through other connections (not shown) to the braking equipment of the tractor.

The piston 6 of the emergency relay valve is subjected, therefore, to pressure and its downward displacement effects by means of the rod 14 and rocker 15 the closing of the cutoff valves $V_1$ and $V_2$. The operation of the two sections is thus effected. Contemporaneously, the elastic element $M_2$ is subjected to load whereby rocker 19 is activated as soon as the spring load in $M_2$ is sufficient to overcome the resistance of the control system for the distributors $D_1$ and $D_2$ constituted by the opposed springs, the friction and so forth therein. To insure the closing of the valves V1 and V2 with respect to the opening of the distributing valves $d_1$ and $d_2$, there is moreover required a smaller stroke of the former than for the actuating member of the latter.

The opening of the distributing valves $d_1$ and $d_2$ causes inflow of compressed air into the operating elements of the braking section of the trailer.

If the action upon the brake pedal ceases, the compressed air present in the chamber 4 flows back through the conduit 13 and the piston 6 returns to its rest position thereby effecting closure of the valves $d_1$ and $d_2$ and, with a slight delay, the opening of valves $V_1$ and $V_2$.

As illustrated, control of the distributing valves $d_1$ and $d_2$ is independent of the control rocker 15 for the cut-off valves and, therefore, the possibility is avoided of acting with different pressures upon the braking elements.

The diagrams of FIGS. 2a, 2b, 2c, 2d, and 2e illustrate the different relations of the pressure p acting upon the braking elements of a tractor and of a trailer as a function of the control-load P, which in case of a trailer with the above emergency relay valve corresponds to the force that actuates the rod 14.

R and $M_0$ indicate respectively the braking characteristic curves for the trailer and the tractor.

The assumption is made that the characteristic curve R is entirely above the characteristic curve $M_0$.

Figure 2A:
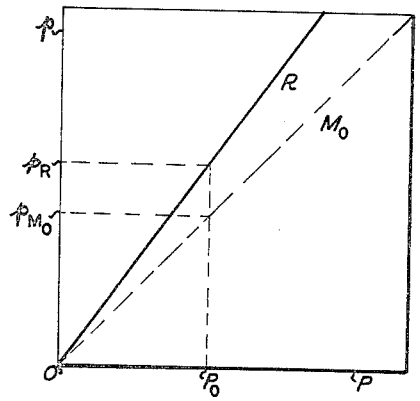
FIGS. 2a, 2b, 2c, 2d and 2e represent graphically the variation of the pressure that acts upon the braking elements as a function of the control-load.

This is shown in FIG. 2a where it appears that at equal control-loads, for instance for the value $P_0$, the pressure acts upon the braking elements is $p_R$ for the trailer and $p_{M_0}$, which is smaller than $p_R$, for the tractor. This corresponds in practice to the precessing or anticipation of braking of the trailer with respect to the tractor. This operating condition is the one normally required and is determined by the geometrical or mechanical characteristics of the equipment.

Figure 2B:
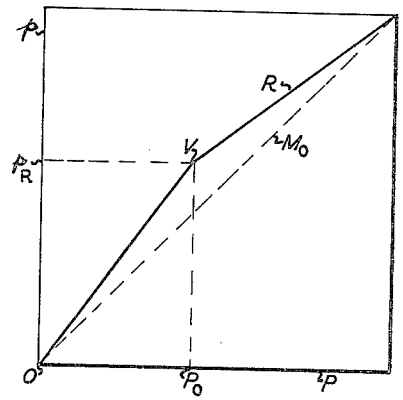
Figure 2C:
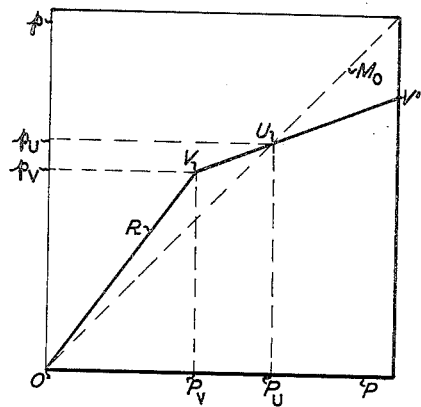

FIGURES 2b–2c consider the course of pressure $p$ under the assumption that the equipment is altered to modify its characteristics.

In particular:

From FIG. 2b, it appears that the characteristic curve of the trailer has a singular point V which divides said characteristic curve into two sections having different slopes.

This is obtained by the adoption of particular characteristics for the reacting spring M of FIG. 1, which intervenes to modify the course of $p$ only if the rod 14, or in FIG. 1, the disc 18 has shifted enough to encounter said spring M.

According to the diagram, the point V corresponds to the value $P_0$ of the control-load. The greatest force opposed to the displacement of the piston 6 diminishes the slope of the characteristic R which corresponds to a diminution of the rate of increase of pressure acting upon the braking members of the trailer with respect to those which one would have without the use of the spring M. The elastic characteristic of M may be selected in such a way as to obtain towards the high values of $p$ a pressure upon the braking elements which is equal for the tractor and for the trailer.

From FIG. 2c, it appears that the second section V—V' of the characteristic curve of R can be made to intersect the curve $M_0$ at the point U. Hence for values of the control-load between zero and $P_u$, the action applied to the trailer is more vigorous than upon the tractor, while for values beyond $P_u$ the braking action exerted upon the tractor is larger.

This is obtained by adopting a spring M having greater rigidity than that of the spring used for this diagram of FIG. 2b.

Figure 2D:
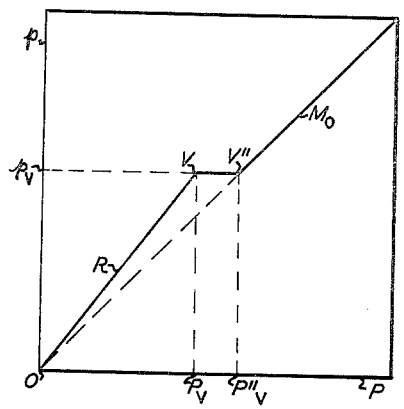

From FIG. 2d appears the singular course of the characteristic curve of the trailer which, after a first section O—V corresponding to the preceding ones, presents a horizontal section V—V'' corresponding to the increase of the control-load $P_v$—$P''_v$, and to the pressure $p_V$, and a final section corresponding, for instance, with the characteristic curve $M_0$.

Hence for values of the control-load lower than $P''_v$, the braking action is more vigorous upon the trailer than upon the tractor while, for values higher than $P''_v$ the braking action, owing to the assumption made, it is equal for the tractor and for the trailer.

This is obtained if the spring M is pre-loaded with a force corresponding to $P_v$—$P''_v$.

Figure 2E:
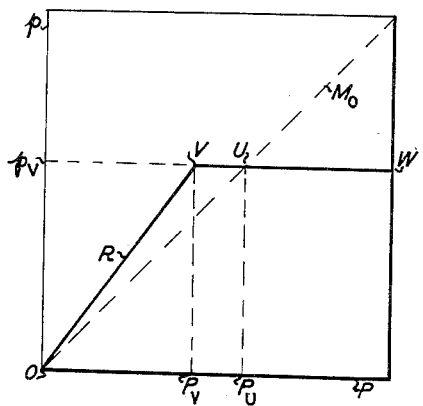

From FIG. 2e it appears that after the first section O—V of R there follows a second section V—W which is horizontal. For values of the control-load between zero and $P_u$ the braking action is more vigorous for the trailer, while for the values higher than $P_u$ the more vigorous action is exerted upon the tractor.

From the value $P_v$ of the control-load and greater the pressure upon the braking elements of the trailer is constant at the value $p_v$.

This is obtained by preventing further displacement of spring $M_1$ and disc 18 after a certain displacement thereof.

According to FIG. 2c, the maximum displacement corresponds to the value of $P_v$ of the control-load.

Figure 3:
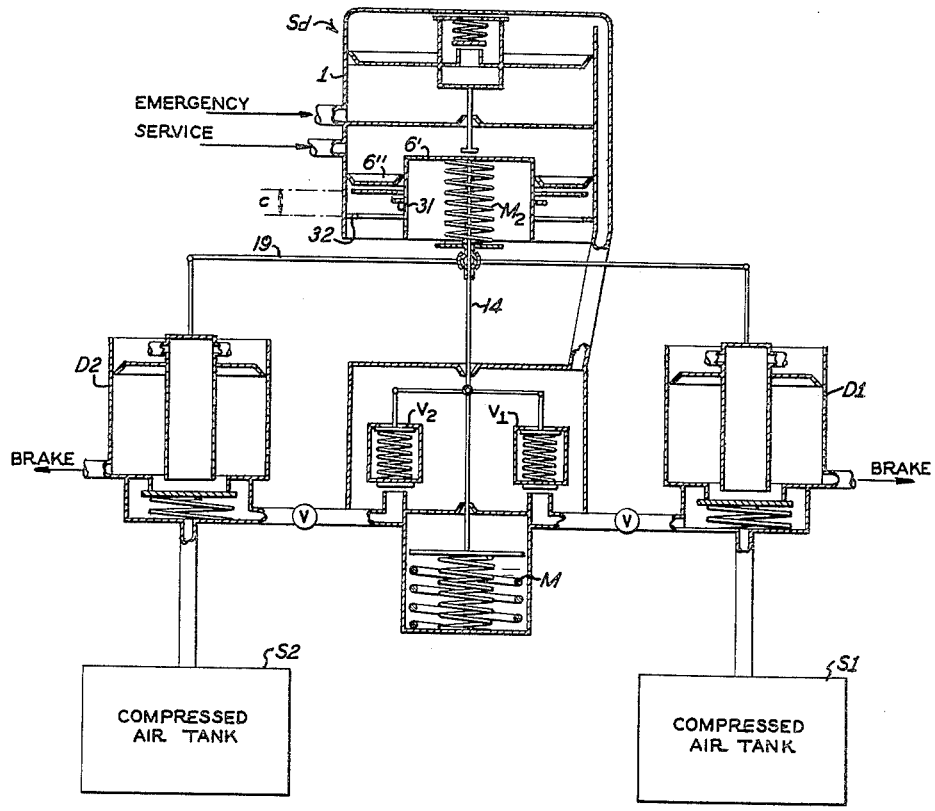
FIG. 3 shows a modification of the piston for controlling the equipment.

FIG. 3 shows another embodiment of the emergency relay valve piston. This piston is formed by a central section 6' and by an annular section 6'' which is provided with double sealing. Annular section 6'' has an outer lip slidable on the cylinder 1 of the emergency relay valve Sd and an inner lip slidable on the side of the piston 6'.

The central piston is provided with a stop 31 which permits the simultaneous advancement of the two sections 6'—6'' only for a stroke equal to $c$. A second stop 32 is rigid with the cylinder 1 and its function is to prevent the annular section 6'' from further advancement after the stroke $c$. Hence while in a first stage the action exerted on the rod 14 is due to the simultaneous action of the two sections 6'—6'', in a second stage said action is reduced to that exerted by the sole acting section, internal section 6'.

Thereby a greater sensitivity of the device is attained in the initial stage of braking and there is provided the possibility of a graduation of the pressure of the fluid operating upon the braking elements in the subsequent stage.

Figure 4:
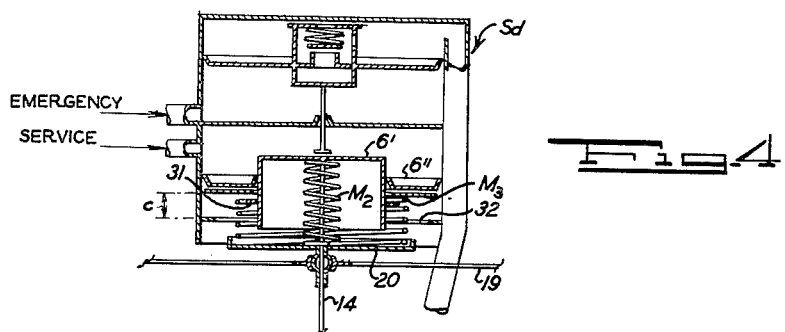
FIG. 4 is a variant of the modification of FIG. 3 thereof.

FIG. 4 shows a variant of the embodiment of FIG. 3.

In addition to the spring $M_2$ placed between the slide 20 and the piston 6', there is provided a reaction spring $M_3$ interposed between the annular section 6'' and said slide 20.

Thereby, part of the load acting upon the external section 6'' is kept active during the abutment of said section against the stop 31 and, therefore, during the stroke $c$ corresponding to the opening stage of the distributing valves, both sections exert all their action upon the rod 14 in the subsequent section. If the graduation of the pressure of the operating fluid is required, the part of the force transmitted by the external section 6'' upon said rod may be established in the most convenient way, since it depends only on the characteristics of the reaction spring adopted.

The invention has been illustrated with reference to a particular case, that is, to apparatus on a vehicle with two sections; however, the application of the device to devices with more sections and also to fixed devices will now be obvious.

What is claimed is:

1. A control for a pneumatic medium adapted to operate brakes, said control being operative in association with a first source of a medium under constant pressure and a second source of a medium under variable pressure, said control comprising means provided with first and second chambers respectively coupled to said sources, a piston in said second chamber, a rod coupled to said piston and displaceable therewith in response to a varying pressure in said second chamber, a resilient member operatively associated with said rod to oppose movement thereof, a rocker connected to said rod and movable therewith, valve control members on said rocker, means provided with a further chamber coupled to the first chamber for receiving the medium from said first chamber, valves in said further chamber controlling the flow of medium therefrom, said valves being adjacent said valve control members and being controlled by movement of said valve control members, sources of braking media, further valves between the latter said sources of braking media and said brakes for controlling the flow of medium from said latter sources to said brakes, conduit means for establishing fluid communication between said further chamber and said further valves so that said further valves are urged to a closed position by pressure controlled by the first said valves, said conduit means coupling said source of braking media via said further chamber to said first chamber, a second rocker pivotally coupled to said rod and movable therewith to engage said further valves to open the same, and resilient means between said piston and said second rocker.

2. A control as claimed in claim 1 comprising a further resilient member engaging said rod to resist movement of the same, the resilient members which engage the rod being of different strengths.

3. A control as claimed in claim 1, wherein said piston comprises two concentric displaceable sections, comprising a stop for terminating movement of one of the sections upon a predetermined movement of said rod.

4. A control as claimed in claim 3 wherein said resilient means engages only one of the piston sections.

5. A control as claimed in claim 3 wherein said resilient means includes springs engaging respective of the piston sections.

6. A control as claimed in claim 1 comprising a bearing slidable on said rod and supporting said second rocker.

7. A control as claimed in claim 1 comprising a further resilient member engaging said rod to resist movement of the same, the resilient members which engage the rod being of different strengths, and said piston comprises two concentric displaceable sections, comprising a stop for terminating movement of one of the sections upon a predetermined movement of said rod.

8. A control as claimed in claim 1 wherein said second rocker moves a determinable distance to engage said further valves, said distance being greater than the movement of the valve control members to close said valves in the further chamber, the control further comprising elastic means between the first said valves and said valve control members to oppose movement of said first valves thereby enabling said further valves to be disengaged from said second rocker prior to the opening of the first said valves during movement of said rod in opposite direction.

References Cited in the file of this patent
UNITED STATES PATENTS

| | | |
|---|---|---|
| 2,562,370 | Seale | July 31, 1951 |
| 2,745,702 | Burdick | May 15, 1956 |
| 2,831,733 | Almond | Apr. 22, 1958 |
| 2,850,330 | Andrews | Sept. 2, 1958 |
| 2,980,468 | Alfieri | Apr. 18, 1961 |